Figure 1:
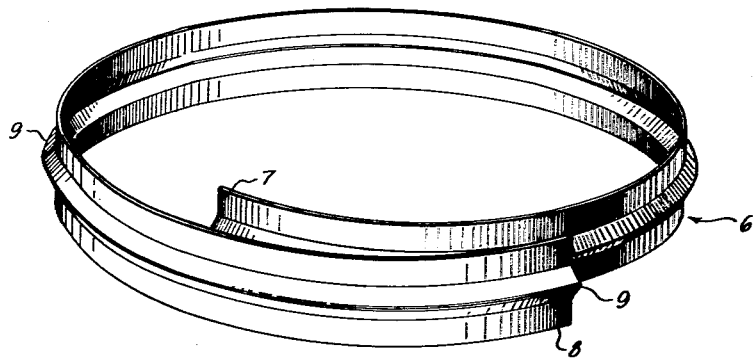

July 25, 1961  M. O. PORTER ET AL  2,993,614
BAKE STRIP
Filed Feb. 1, 1960

INVENTORS:
GEORGE L. PORTER
BY   MARY O. PORTER

Robert H. Eckhoff
ATTORNEY

United States Patent Office 2,993,614
Patented July 25, 1961

2,993,614
BAKE STRIP
Mary O. Porter and George L. Porter, both of
170 Mendocino Drive, Ukiah, Calif.
Filed Feb. 1, 1960, Ser. No. 5,964
2 Claims. (Cl. 220—4)

This invention relates to a guard adapted to be secured to a pie plate to extend above the rim thereof to retain juices released from the pie while it is baking and to protect the adjacent crust.

While pie plateguards have been proposed heretofore, these have usually been relatively complex and involved structures including various snaps and buckles to enable the guard to be secured in place about the rim of a pie plate. Since pie plates vary in size, it has been necessary heretofore to have various size guards to ensure that one would be available for each size plate to be used.

In accordance with the present invention, we provide a relatively simple pie plate guard which is capable of inherently retaining itself in position on a pie plate. At the same time, the pie plate guard of this invention is of such construction that it will fit a pie plate of any diameter even though this differ in diameter slightly.

It is in general the broad object of the present invention to provide a pie plate guard which is simple and inexpensive to manufacture yet will fit any circular pie plate to prevent the edges of the crust from burning or drying too quickly and which will retain the contents of the pie plate during baking.

The invention includes other objects and features of advantage, some of which, together with the foregoing, will appear hereinafter wherein the present preferred form of pie plate guard of this invention is disclosed. In the drawing accompanying and forming a part hereof, FIGURE 1 is a perspective view showing the pie plate guard when not in use.

Figure 2:
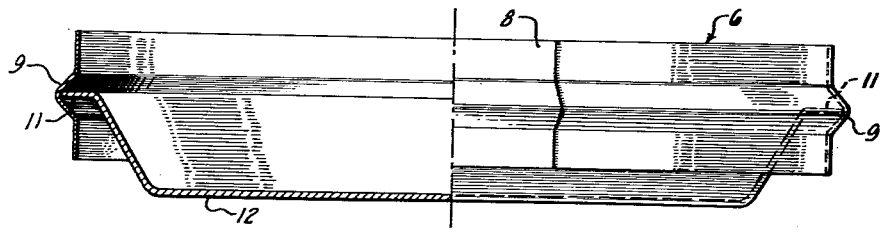

FIGURE 2 is a side elevation, partly in section, showing the pie plate guard in position on a pie plate.

Referring to the drawing, and particularly to FIGURE 1, the pie plate guard of this invention consists of a strip of a resilient metal, generally indicated at 6. This strip is coiled upon itself and is of a length somewhat greater than the circumference of the largest diameter pie plate rim whereby the ends 7 and 8 overlap one another. Provided midway of the strip in its transverse dimension is a continuous groove 9 running the length of the strip. This groove is of a shape and depth to receive the rim 11 on a pie plate 12 and so retain the strip in position on the plate. Since the ends 7 and 8 of the strip overlap one another with the overlapped grooved ends fitting against each other, it will be apparent that the strip can be fitted into place readily to pie plates of different sizes. Inherently, the strip includes sufficient resilience so that it retains itself in its coiled form.

It is preferred to provide the groove 9 midway of the strip so that even heat distribution is provided to the top of the pie as well as to the sidewall or bottom. This construction also prevents hot spots around the edge of the pie due to the thin area of a pie crust.

From the foregoing, it is believed it will be apparent that we have provided a novel, simple and improved guard for a pie plate to protect and improve the baking of a pie.

We claim:

1. A guard ring for mounting on the outwardly directed rim of a pie plate, said ring being adapted to be mounted on said rim and consisting of a strip of a resilient metal coiled upon itself and of a length greater than the circumference of said rim whereby the ends of the strip overlap when the ring is positioned on said rim, said strip having a groove extending lengthwise of the strip and adapted to fit the rim on the pie plate to position the ring in a guarding position, the resiliency of the metal being sufficient that the strip maintains itself in coiled form upon itself with the ends of the strip in an overlapping position with one end of the strip sliding over the other to permit the strip to be fitted to pie plates of different diameter.

2. A guard ring for mounting on the outwardly directed rim of a pie plate, said ring being adapted to be mounted on said rim and consisting of a strip of a resilient metal coiled upon itself and of a length greater than the circumference of said rim whereby the ends of the strip overlap when the ring is positioned on said rim, said strip having a groove provided substantially midway of the strip and extending lengthwise of the strip and adapted to fit the rim on the pie plate to position the ring in a guarding position, the resiliency of the metal being sufficient that the strip maintains itself in coiled form upon itself with the ends of the strip in an overlapping position with one end of the strip sliding over the other to permit the strip to be fitted to pie plates of different diameter.

References Cited in the file of this patent
UNITED STATES PATENTS

| | | |
|---|---|---|
| 195,080 | Beal | Sept. 11, 1877 |
| 368,382 | Crawford | Aug. 16, 1887 |
| 1,153,757 | Brending | Sept. 14, 1915 |
| 1,834,402 | Houston | Dec. 1, 1931 |
| 2,077,868 | Adams | Apr. 20, 1937 |
| 2,222,512 | Morgen | Nov. 19, 1940 |
| 2,552,702 | Woolfolk | May 15, 1951 |